Figure 1:
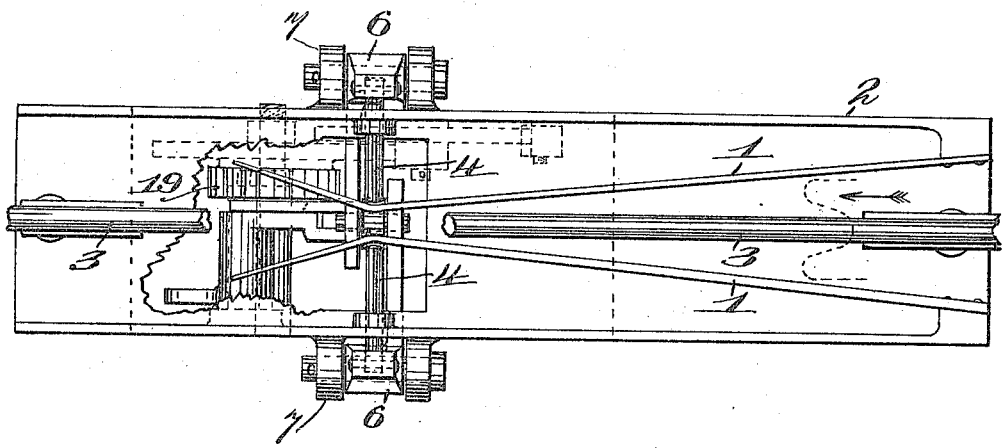

W. D. WRIGHT.
CIRCUIT CLOSER FOR TROLLEY SIGNALS.
APPLICATION FILED MAR. 18, 1910.

1,185,037.

Patented May 30, 1916.
2 SHEETS—SHEET 1.

Witnesses
M. L. Gilman.
H. J. Drummey.

Inventor
William D. Wright
by his Attorneys
Phillips Van Everen & Fish

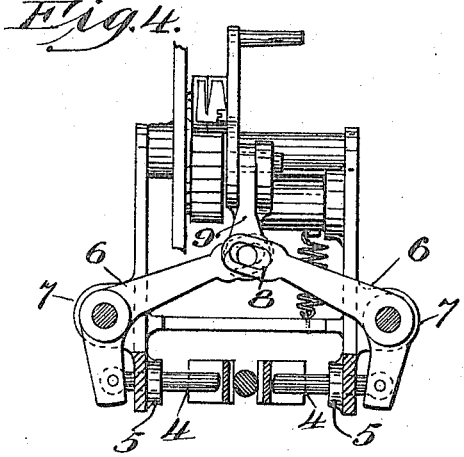

UNITED STATES PATENT OFFICE.

WILLIAM D. WRIGHT, OF PROVIDENCE, RHODE ISLAND, ASSIGNOR TO ELECTRIC-RAILWAY SIGNAL COMPANY, OF KITTERY, MAINE, A CORPORATION OF MAINE.

CIRCUIT-CLOSER FOR TROLLEY-SIGNALS.

1,185,037.

Specification of Letters Patent.  Patented May 30, 1916.

Application filed March 18, 1910.  Serial No. 550,279.

*To all whom it may concern:*

Be it known that I, WILLIAM D. WRIGHT, a citizen of the United States, residing at Providence, in the county of Providence and State of Rhode Island, have invented certain new and useful Improvements in Circuit-Closers for Trolley-Signals; and I do hereby declare the following to be a full, clear, and exact description of the invention, such as will enable others skilled in the art to which it appertains to make and use the same.

The present invention relates to an improvement in trolley circuit closers whereby certain objectionable features of the previous types of circuit closers are obviated.

It is customary in circuit closers of this general type to provide a movable actuating member upon the trolley wire operated by engagement with the trolley wheel of a passing car. It has been found in practice, however, that with the cars running at the high rates of speed, which at present prevail, the engagement of the trolley wheel with the actuating member is liable to throw the wheel from the trolley wire, which not only makes it necessary for the car to be stopped in order that the trolley may be replaced, but is also objectionable in that the signal is oftentimes not operated properly.

The object of the present invention is to provide means which will render the actuation of the circuit closer by the trolley wheel certain and positive, and also to prevent the objectionable feature whereby the trolley wheel is thrown from the wire upon engagement with the actuating member.

A further object of the invention is to provide improved mechanism for transmitting movement from the movable actuating member to the circuit closing mechanism.

My invention comprises one or more movable actuating members or arms, which are moved laterally or parallel to the axis of the trolley wheel, upon the engagement therewith of a passing trolley wheel. In the present embodiment of the invention, the actuating members engage the rim of the wheel. The resulting pressure of the actuating members upon the trolley wheel is always in a horizontal plane and there is no downward thrust tending to force the trolley wheel from the wire.

My preferred form of invention consists in using two actuating members, one upon each side of the trolley wire but I wish to have it understood that only one such member may be used, if so desired. I am enabled by the use of two actuating members to better retain the trolley wheel upon the wire, as any side thrust upon the wheel which may be given by one actuating member is resisted by the opposite member. In other words, the two members neutralize each other in their tendency to deflect the trolley wheel sidewise.

A preferred form of my invention is illustrated in the accompanying drawings in which—

Figure 2:
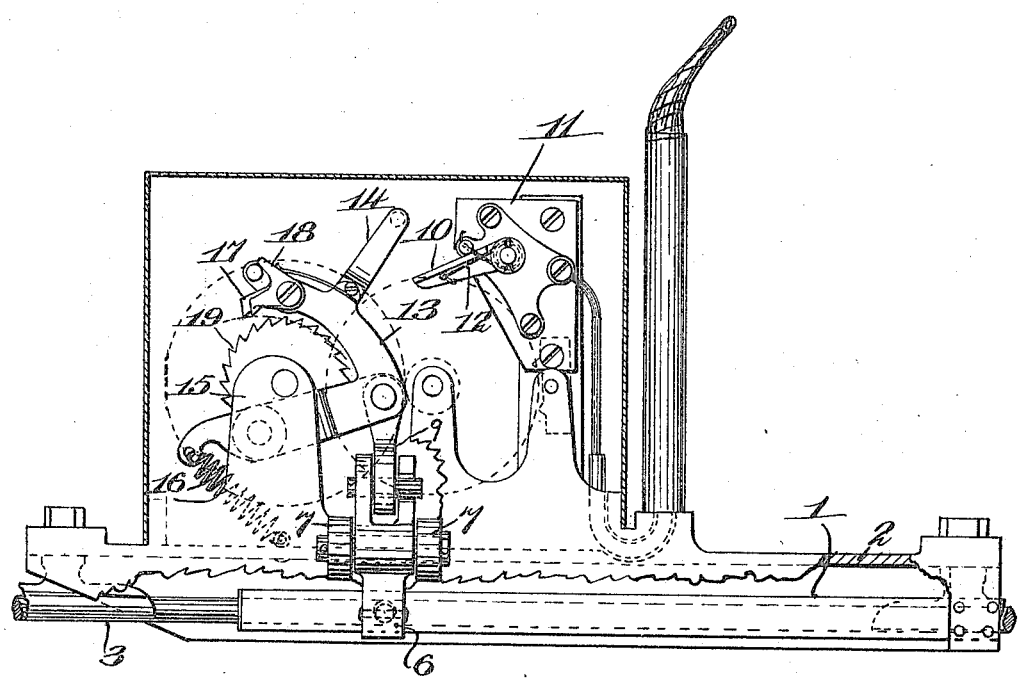

Figure 1 is a plan view of my improved device shown as applied to a trolley wire and looking up at the same from underneath. The rim of a trolley wheel is also shown in dotted outline about to engage the actuating members. Fig. 2 is a side elevation of the structure shown in Fig. 1 with the casing surrounding the circuit closing mechanism cut away and the circuit closer shown in its normally inoperative position. Fig. 3 is a side elevation showing the circuit closing means in its operative position and with the surrounding casing removed. Fig. 4 is an end elevation partly in section of the structure shown in Fig. 2. Fig. 5 is an end elevation partly in section showing the trolley wheel passing between the actuating members and Fig. 6 is a detail showing the improved form of actuating members, and the supporting means therefor.

The actuating members 1 are shown as supported by a casing 2 fastened to the trolley wire 3. The said members in the preferred form of the invention converge gradually from their fixed ends toward the free ends of the same and are so arranged and supported with respect to the trolley wire that they engage a trolley wheel running thereon at a point forwardly of the center and somewhat below the top. The trolley wheel traveling at a high rate of speed approaches the wedge shaped entrance formed by the two actuating members but owing to the gradual inclination of the members the wheel has to travel a relatively long distance to move the members outwardly a slight amount and the resulting movement of the actuating members is comparatively slow. The shock of the engagement between the trolley wheel and actuating members is therefore reduced to a minimum. The two actuating members are engaged by the rim of the trolley wheel at a point upon the two opposite edges of the rim, slightly above the center of the wheel and forwardly of the same. The side thrust due to the individual actuating members is neutralized by placing two of them upon opposite sides of the wheel. The resulting pressure on the trolley wheel due to the lateral thrusting aside of the actuating members is a force acting parallel to the travel of the trolley wheel and in the opposite direction and consequently does not tend to deflect the trolley wheel downwardly from the wire. It will of course be obvious to any one skilled in the art that various changes in the inclination and fastening means for my improved actuating members may be made. The actuating members are shown with the fixed ends nearest to the trolley wheel as it approaches them, so that the wheel will engage this end first without any tendency to buckle or bend the members.

Arranged with their inner ends abutting the sides of the actuating members are plungers 4 slidably mounted in bearings 5 in the casing 2. These plungers are pivotally connected to the bell cranks 6. The bell cranks are mounted in a plane at right angles to that of the actuating members and trolley wire and are pivotally supported upon the casing 2, in the bearings 7. These bell crank levers have their upper arms inclined toward one another and the ends of the same are connected to each other and to a link 9 by a pin and slot connection. The ends of the bell cranks 6 are slotted longitudinally at 8 and a pin 21 is fastened to the lower end of the link 9 and slides in the slots 8. This link has its upper end connected to the lever of the circuit closing mechanism which will be hereinafter more fully described. The above described construction is such that upon the actuating members being pressed outwardly by engagement with the trolley wheel, motion is transmitted through the plungers and system of bell crank levers described, to the circuit closing mechanism. The improved arrangement of parts heretofore described is shown in connection with a circuit closing mechanism of the type disclosed in application for Letters Patent to Chapman, Serial No. 435,371, dated May 28, 1908. I wish to have it understood, however, that I do not desire to limit myself to its employment with the circuit closing means described but that it may be used in connection with any preferred type of circuit closing means.

I will now describe briefly the preferred form of circuit closing means shown therein. In this form there is a yieldable contact plate 10 mounted on a fixed support 11 and normally held in the position shown in Fig. 2 by means of a spring 12. This plate is connected by any suitable means with one pole of a source of electric energy. Mounted integrally with the curved lever 13 is the movable contact arm 14. The curved lever is pivotally supported upon a projecting portion 15 of the frame and has connected at the outer end thereof a spring 16. Upon the end of the lever adjacent the contact arm 14 are mounted a pair of staggered pawls 17 and 18. These pawls are adapted to operate on a ratchet wheel 19 mounted in the upright 15 eccentrically to the lever 13. The movable contact arm 14 is connected by any suitable means to the opposite pole of the electric generator from the contact 10. As stated previously the upper end of the link 9 is pivotally connected to the elbow of the lever 13, and upon the downward movement of the link 9, motion will be transmitted to the movable contact 14 and the same will close the circuit through the contact 12. This will, however, force the contact 12 over to a position which is approximately that shown in Fig. 3 of the drawing. Upon the return of the actuating members 1 to their normal position the spring 16 will tend to force the two arms 14 and 12 out of engagement with one another. This tendency however, is resisted by the engagement of the pawls 17 and 18 with the ratchet wheel 19, the ratchet wheel 19 being connected through a suitable train of gearing with any preferred form of pallet and escapement wheel in order that only a slow return of the same may be had. During a portion of this return movement the spring 12 will cause the contact 10 to follow the contact 14 insuring a closed circuit for a sufficient length of time to properly actuate the signals. It will be noticed, however, that the mounting for the ratchet wheels and the staggered pawls is eccentric and at a certain point in the travel the pawls will ride off from the teeth of the ratchet allowing the lever 13 and contact 14, through the spring 16 to fly back quickly insuring a quick break at the end of the contact.

The nature and scope of the present invention having been indicated and a preferred form of the invention having been specifically described, what is claimed is:—

1. A trolley circuit closer comprising a circuit closing lever, a pair of converging members supported in the path of a moving trolley wheel and arranged to separate in a substantially horizontal plane when the wheel passes between them, and connections between the members and circuit closing lever to actuate the lever upon separating the members.

2. A trolley circuit closer, having, in combination, contacts, and means for relatively moving the contacts to close the circuit comprising actuating members fastened at one end and arranged upon opposite sides of the wire converging toward their free ends, the said members mounted to move transversely to the direction of travel of the trolley.

3. A trolley circuit closer, having, in combination, contacts, and means for relatively moving the contacts to close the circuit comprising a flat spring actuating member fastened at one end, said spring actuating member arranged to present the flat side thereof to a passing trolley wheel, the said member mounted to move transversely to the direction of travel of the trolley.

4. A trolley circuit closer, having, in combination, a trolley wire, a circuit closing mechanism supported thereby, an actuating member adjacent the trolley wire and mounted to move transversely to the direction of travel of the trolley, a plunger operated by said actuating member, a bell crank operated by the plunger, and connections between said bell crank and said circuit closing mechanism, whereby said circuit closing mechanism is operated upon movement of the actuating member.

5. A trolley circuit closer, having, in combination, a trolley wire, a circuit closing mechanism supported thereby, a pair of actuating members adjacent the trolley wire and mounted to move transversely to the direction of travel of the trolley, plungers operated by said actuating members, bell cranks operated by the plungers and connections between said bell cranks and said circuit closing mechanism whereby said circuit closing mechanism is operated upon movement of the actuating members.

6. A trolley circuit closer, having, in combination, a trolley wire, a circuit closing mechanism supported thereby, a pair of actuating members adjacent the trolley wire and mounted to move transversely to the direction of travel of the trolley, plungers operated by said actuating members, bell cranks arranged transversely of the actuating members, having their lower ends connected to the said plungers and a connection between the upper ends of the said bell cranks and the circuit closing mechanism, the circuit closing mechanism lying in a plane of the trolley wire.

WILLIAM D. WRIGHT.

Witnesses:
ALFRED H. HILDRETH,
WARREN G. OGDEN.

Copies of this patent may be obtained for five cents each, by addressing the "Commissioner of Patents, Washington, D. C."